(12) United States Patent
Murata (10) Patent No.: US 10,576,987 B2
(45) Date of Patent: Mar. 3, 2020

(54) DRIVE ASSIST APPARATUS AND METHOD

(71) Applicant: Honda Motor Co., Ltd., Tokyo (JP)

(72) Inventor: Satoshi Murata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 15/839,449

(22) Filed: Dec. 12, 2017

(65) Prior Publication Data

US 2018/0178807 A1    Jun. 28, 2018

(30) Foreign Application Priority Data

Dec. 27, 2016   (JP) .................................. 2016-253777

(51) Int. Cl.
| | |
|---|---|
| *B60W 40/08* | (2012.01) |
| *B60W 50/08* | (2020.01) |
| *G01C 21/34* | (2006.01) |
| *B60W 30/10* | (2006.01) |
| *B60W 50/14* | (2020.01) |
| *B60W 50/00* | (2006.01) |

(52) U.S. Cl.
CPC ............ *B60W 40/08* (2013.01); *B60W 30/10* (2013.01); *B60W 50/08* (2013.01); *B60W 50/082* (2013.01); *B60W 50/14* (2013.01); *G01C 21/34* (2013.01); *G01C 21/3484* (2013.01); *B60W 2050/0078* (2013.01); *B60W 2050/146* (2013.01); *B60W 2540/22* (2013.01)

(58) Field of Classification Search
CPC ................. B60W 40/08; B60W 40/09; B60W 2040/0809; B60W 2040/0872; B60W 2040/089; B60W 50/08; B60W 50/14; B60W 2050/146; B60W 2540/00; B60W 2540/02; B60W 2540/04; B60W 2540/22; B60W 2540/30; G01C 21/34; G01C 21/3407; G01C 21/3453; G01C 21/3461; G01C 21/3484; G01C 21/3492; G01C 21/3691
See application file for complete search history.

(56) References Cited

U.S. PATENT DOCUMENTS

| | | | |
|---|---|---|---|
| 9,889,856 B1 * | 2/2018 | Zhang .................... | B60W 40/08 |
| 2003/0060937 A1 * | 3/2003 | Shinada ............. | G01C 21/3641 |
| | | | 701/1 |
| 2009/0326814 A1 * | 12/2009 | Harumoto .......... | G01C 21/3655 |
| | | | 701/414 |

(Continued)

FOREIGN PATENT DOCUMENTS

| | | |
|---|---|---|
| JP | H05164566 A | 6/1993 |
| JP | 2004325255 A | 11/2004 |

(Continued)

*Primary Examiner* — Thomas G Black
*Assistant Examiner* — Sara J Lewandroski
(74) *Attorney, Agent, or Firm* — Duft & Bornsen, PC (57) ABSTRACT

A drive assist apparatus, including a skill detecting unit detecting a driving skill of a driver of a vehicle, a biometric information acquiring unit acquiring a biometric information of the driver, a feeling estimating unit estimating a feeling of the driver based on the biometric information acquired, a plan generating unit generating a drive plan based on the driving skill detected and the feeling estimated, and a plan presentation unit presenting the drive plan generated to the driver.

12 Claims, 5 Drawing Sheets

(56) References Cited

U.S. PATENT DOCUMENTS

| | | | | |
|---|---|---|---|---|
| 2012/0150430 A1* | 6/2012 | French | ............... | G01C 21/3415 |
| | | | | 701/425 |
| 2014/0272810 A1* | 9/2014 | Fields | ............... | G01C 21/3676 |
| | | | | 434/65 |
| 2014/0309790 A1* | 10/2014 | Ricci | .................... | B60N 2/0244 |
| | | | | 700/276 |
| 2014/0309933 A1* | 10/2014 | Shin | .................. | G01C 21/3484 |
| | | | | 701/533 |
| 2015/0260531 A1* | 9/2015 | Ehsani | ............... | G01C 21/3461 |
| | | | | 701/538 |
| 2016/0176412 A1* | 6/2016 | Gunaratne | ............ | B60W 10/10 |
| | | | | 701/23 |
| 2016/0297478 A1* | 10/2016 | Inoue | ....................... | B60T 8/246 |
| 2017/0038773 A1* | 2/2017 | Gordon | ............... | G05D 1/0061 |
| 2017/0225677 A1* | 8/2017 | Yoshida | ............... | A61B 5/0476 |
| 2017/0370732 A1* | 12/2017 | Bender | .............. | G01C 21/3492 |
| 2017/0370736 A1* | 12/2017 | Singh | .................. | G01C 21/3415 |
| 2018/0086347 A1* | 3/2018 | Shaikh | .................. | B60W 40/09 |
| 2018/0109924 A1* | 4/2018 | Agrawal | ............... | H04W 4/029 |
| 2018/0172464 A1* | 6/2018 | Sekizawa | ........... | G01C 21/3461 |
| 2019/0049261 A1* | 2/2019 | Colby | ................ | G01C 21/3461 |
| 2019/0086223 A1* | 3/2019 | Tanaka | ................... | G01C 21/34 |
| 2019/0162549 A1* | 5/2019 | Fouad | .................. | B60W 40/08 |

FOREIGN PATENT DOCUMENTS

| | | | |
|---|---|---|---|
| JP | 2005106475 A | 4/2005 |
| JP | 2005283168 A | 10/2005 |
| JP | 2008058039 A | 3/2008 |

\* cited by examiner

| DRIVING SKILL | FIRST RECOMMENDED ROUTES |
|---|---|
| CLASS A | ROUTE A |
| CLASS B | ROUTE A, ROUTE B |
| CLASS C | ROUTE A, ROUTE B, ROUTE C |

FIG. 3

| DRIVING SKILL | SECOND RECOMMENDED ROUTES |
|---|---|
| CLASS A | (ROUTE A) ROUTE B, ROUTE C |
| CLASS B | (ROUTE A, ROUTE B) ROUTE C |
| CLASS C | (ROUTE A, ROUTE B, ROUTE C) ROUTE D |

DRIVE ASSIST APPARATUS AND METHOD

CROSS-REFERENCE TO RELATED APPLICATION

This application is based upon and claims the benefit of priority from Japanese Patent Application No. 2016-253777 filed on Dec. 27, 2016, the content of which is incorporated herein by reference.

BACKGROUND OF THE INVENTION

Field of the Invention

This invention relates to a drive assist apparatus and method which generates and provides drive plans matched to driver driving skill.

Description of the Related Art

Apparatuses that calculate travel routes reflecting driver driving skill are already known. Japanese Unexamined Patent Publication No. 2005-106475 (JP2005-106475A), for example, teaches an apparatus that presents to a driver a number of candidate routes between starting point and destination, and selects for presentation to a low-skill driver the route among the candidates that has the fewest hard-to-drive sections.

However, the apparatus of JP2005-106475A retrieves routes based solely on driver skill without consideration to driver motivation or other feelings, so that it presents the same candidate routes regardless of whether the driver's eagerness to drive is high or low, and as such inadequately contributes to increasing driver satisfaction with candidate routes.

SUMMARY OF THE INVENTION

An aspect of the present invention is a drive assist apparatus, including: a biometric information acquiring unit configured to acquire a biometric information of a driver of a vehicle; and a CPU and a memory coupled to the CPU, wherein the CPU and the memory are configured to perform: detecting a driving skill of the driver; estimating a feeling of the driver based on the biometric information acquired by the biometric information acquiring unit; generating a drive plan based on the driving skill detected and the feeling estimated; and presenting the drive plan generated to the driver.

Another aspect of the present invention is a drive assist apparatus, including: a skill detecting unit configured to detect a driving skill of a driver of a vehicle; a biometric information acquiring unit configured to acquire a biometric information of the driver; a feeling estimating unit configured to estimate a feeling of the driver based on the biometric information acquired by the biometric information acquiring unit; a plan generating unit configured to generate a drive plan based on the driving skill detected by the skill detecting unit and the feeling estimated by the feeling estimating unit; and a plan presentation unit configured to present the drive plan generated by the plan generating unit to the driver.

Further aspect of the present invention is a drive assist method, including: detecting a driving skill of a driver of a vehicle; acquiring a biometric information of the driver; estimating a feeling of the driver based on the biometric information acquired; generating a drive plan based on the driving skill detected and the feeling estimated; and presenting the drive plan generated to the driver.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Now follows an explanation of an embodiment of the present invention with reference to FIGS. 1A to 5. The drive assist apparatus generates various drive plans and presents them to the driver. A target route from current location to destination is explained as an example of such a drive plan in the following.

Figure 1A:
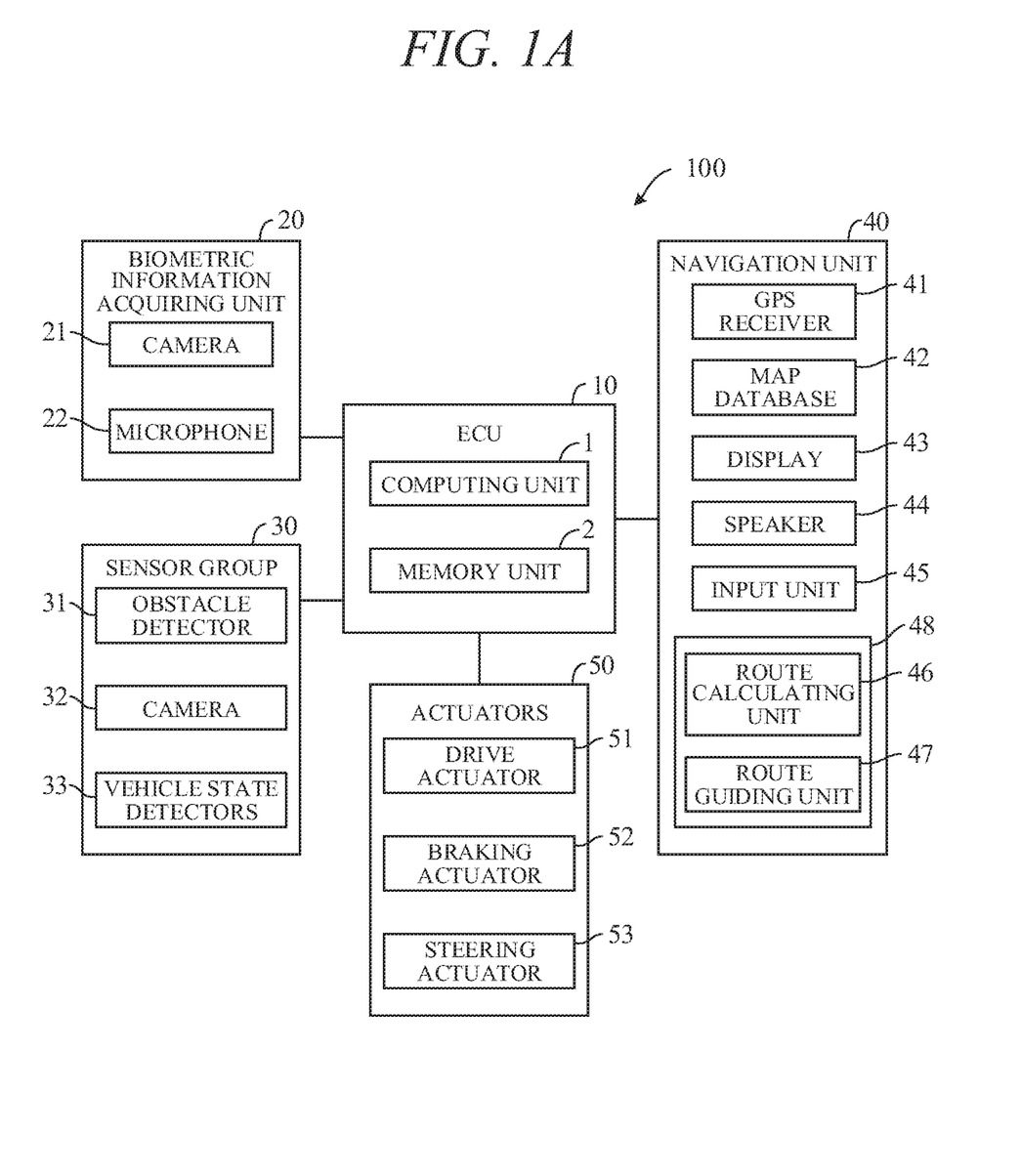
FIG. 1A is a block diagram showing a configuration overview of a drive assist apparatus in accordance with an embodiment of the present invention.

FIG. 1A is a block diagram showing a configuration overview of a drive assist apparatus 100 in accordance with an embodiment of the present invention. This drive assist apparatus 100 is, for example, configured to include a navigation unit mounted in a vehicle. As shown in FIG. 1A, a biometric information acquiring unit 20, a sensor group 30, a navigation unit 40, and actuators 50 are connected to an ECU (Electronic Control Unit) 10 installed in the vehicle.

The biometric information acquiring unit 20 is adapted to acquire biometric information, such as driver facial expression images and driver voice, and is configured to include a camera (interior camera) 21 and a microphone 22 mounted inside the vehicle. The camera 21 has a CCD sensor, CMOS sensor or other image sensor that images upper body and face of a passenger (usually a driver; hereinafter the same). In other words, the camera 21 photographs facial expression and posture of a passenger. The microphone 22 picks up voice sounds uttered by one or more passengers. Voice signals from the microphone 22 are passed through an A/D converter, for example, and input as voice data to the ECU 10, which subjects them to voice recognition.

The sensor group 30 comprises multiple detectors for detecting conditions around the vehicle, including, for example, an obstacle detector 31, a camera (exterior camera) 32, and vehicle state detectors 33. The obstacle detector 31 detects objects by, for example, transmitting radio waves or light into the vehicle surroundings and receiving radio waves or light reflected from objects (people or things), and comprises a millimeter-wave radar or laser radar that detects distance to objects by calculating time to reception of reflected radio waves or light. The camera 32 is, for example, a front camera mounted at the vehicle front end to photograph forward of the vehicle. Alternatively, a rear camera mounted at the vehicle rear end to photograph reward of the vehicle and/or side cameras mounted on sides of the vehicle to photograph sideways of the vehicle can also serve as the camera 32. The camera 32 has a CCD sensor, CMOS sensor or other image sensor.

The vehicle state detectors 33 include various detectors for detecting information related to vehicle driving state, such as a vehicle speed sensor, an acceleration sensor, a yaw rate sensor, and the like. The vehicle state detectors 33 additionally include various detectors for detecting information related to driver driving operations, such as an accelerator pedal sensor for detecting amount of accelerator pedal depression, a brake pedal sensor for detecting amount of brake pedal depression, a steering sensor for detecting steering torque or steering angle, and the like.

The navigation unit 40 comprises a GPS receiver 41 that measures current vehicle position using signals received from GPS satellites, a map database 42 (memory unit) that stores map data, a display 43 provided forward of a driver's seat to display vehicle position information on a map, a speaker 44 that vocally announces various information to the driver, an input unit 45 that receives various commands input by the driver, and a computing unit 48 that performs various computations. As functional constituents, the computing unit 48 includes a route calculating unit 46 that calculates a target route (or routes) and a route guiding unit 47 that performs vehicle route guidance in accordance with the target route(s).

Map data stored in the map database 42 includes information on location, shape and the like of roads, plus information on, inter alia, location, configuration and so on of parking areas and various other facilities. Information stored in the map database 42 need not necessarily be stored in the navigation unit 40 but can instead be stored in memory of the ECU 10 beforehand or can be information acquired from outside the vehicle wirelessly or by wire. The display 43 can be constituted as a liquid-crystal display or a touch panel, and when constituted as a touch panel, the input unit 45 can be provided on the touch panel. It is also possible to constitute the input unit 45 of switches provided on a steering wheel.

The route calculating unit 46 uses current vehicle position data measured by the GPS receiver 41 and map data from the map database 42 to calculate a target route (often multiple target routes) from current position to destination. Then it outputs the current vehicle position data and the target route data to the ECU 10. The route guiding unit 47 performs route guidance by displaying the current vehicle position and the target route (final target route), decided by the ECU 10 as explained later, on the display 43, and vocally outputting associated target route information from the speaker 44.

The actuators 50 are driving actuators for implementing driving operations, including basic vehicle operations like running, turning, and stopping. The actuators 50 include a drive actuator 51 for generating vehicle propulsion force, a braking actuator 52 for generating braking force, and a steering actuator 53 for generating steering force. The actuators 50 generate their forces under control of signals produced by the ECU 10 in response to driver operation of the accelerator pedal, steering wheel, brake pedal etc., i.e., under control of signals output by the ECU 10 in response to detection signals from the vehicle state detectors 33.

In the case of a vehicle driven by an engine, the drive actuator 51 is constituted, for example, as a throttle actuator that controls throttle opening angle. In the case of an electrically driven vehicle or a hybrid vehicle, the drive actuator 51 is constituted, for example, as one or more propulsion motors. The braking actuator 52 is constituted, for example, as hydraulic equipment for supplying hydraulic pressure to brake disks. The steering actuator 53 is constituted, for example, as a steering motor for controlling steering torque of an electric power steering system.

Figure 1B:
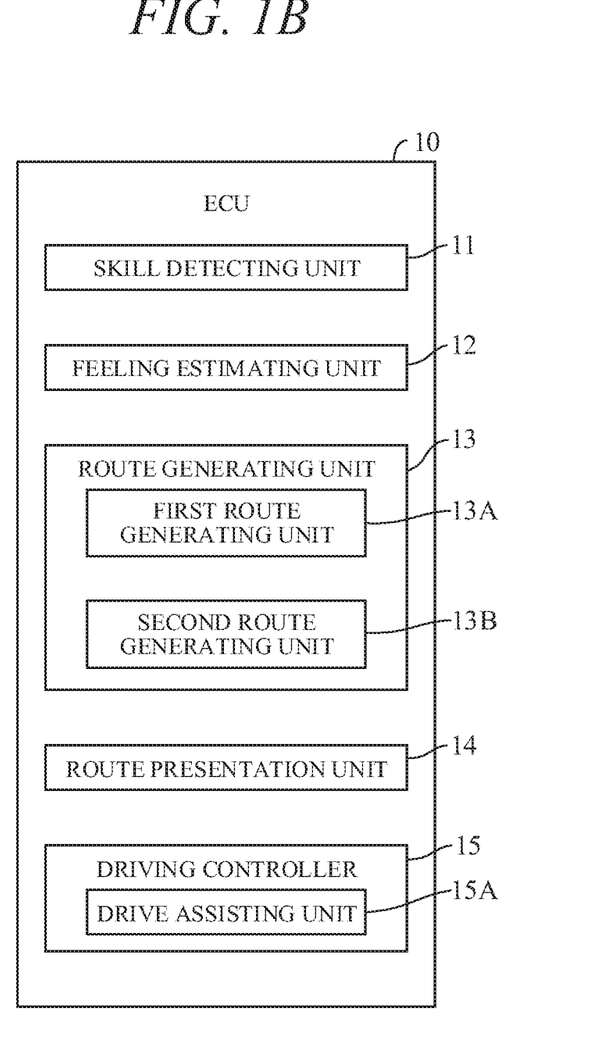
FIG. 1B is a block diagram showing functional constituents of an ECU of FIG. 1A.

The ECU 10 is constituted as a computer comprising a CPU or other computing unit 1, a memory unit 2 incorporating ROM, RAM and the like, and other peripheral circuits. FIG. 1B is a diagram showing functional constituents of the ECU 10 (mainly the computing unit 1). As shown in FIG. 1B, the ECU 10 comprises a skill detecting unit 11, a feeling estimating unit 12, a route generating unit 13, a route presentation unit 14, and a driving controller 15.

The skill detecting unit 11 ascertains or detects driver driving skill based on driver data stored in advance in the memory unit 2. The driver data include driver identification data (name and the like), and data related to driver driving proficiency, namely, individual driver-specific data such as time since acquiring license, driving frequency, vehicle total distance driven, total driving time, and so on. It is also possible to include among data stored as driver data in the memory unit 2 other particulars such as number of instances and frequency of rapid acceleration, sudden braking, sharp turning and similar actions, and distance driven broken down by type of road (e.g., national roads, main local roads, expressways, etc.), among others. Driving skill is, for example, classified into three levels, from Class A to Class C. For example, a freshly licensed driver falls in Class A and is promoted to Class B and Class C with improving driving skill.

The feeling estimating unit 12 estimates feelings of the driver (also sometimes called passenger feelings herein, assuming the driver to be a passenger) from driver facial expression (mouth angle etc.) based on picture signals acquired by the camera 21. As concrete means for this, the feeling estimating unit 11 uses Plutchik's wheel of emotion, for example, to in advance classify passenger emotions into eight primary emotions (anticipation, joy, trust, fear, surprise, sadness, disgust, and anger) and secondary emotions that combine two adjacent primary emotions, compare images that represent characteristics of these emotions with images from the camera 21, and estimate passenger emotion (feelings) by matching with one of the human emotion patterns. Various emotion patterns other than Plutchik's wheel of emotion can be applied instead as human emotion patterns. Passenger emotions (feelings) are estimated not only based on image signals from the camera 21 but also taking voice signals from the microphone 22 into consideration. Namely, passenger feelings are estimated with consideration also to gist of the passenger utterance, voice intonation and pronunciation (prosody) of the utterance, and so on.

The feeling estimating unit 12 further quantifies passenger feelings based on match with the wheel of emotions. For example, feelings a passenger perceives as good, such as joy or delight, i.e., pleasant feelings (favorable emotions), are assigned a positive value, and feelings a passenger perceives as bad, such as disgust or anger, i.e., unpleasant feelings (unfavorable emotions), are assigned a negative value. In such case, value (absolute value) representing an emotion is, for example, increased in proportion as the emotion is stronger (as it is closer to the center of the wheel). The degree of passenger feelings (pleasant feelings, unpleasant feelings) can therefore be measured. After quantifying passenger feelings, the feeling estimating unit 12 determines whether the passenger feelings are equal to or lower than a predetermined value. This determination is for determining whether the driver is displeased. Alternatively, a passenger can be determined to be displeased when a predetermined pattern (e.g., anger or disgust) is estimated, without quantifying the passenger's feelings.

Figure 2:
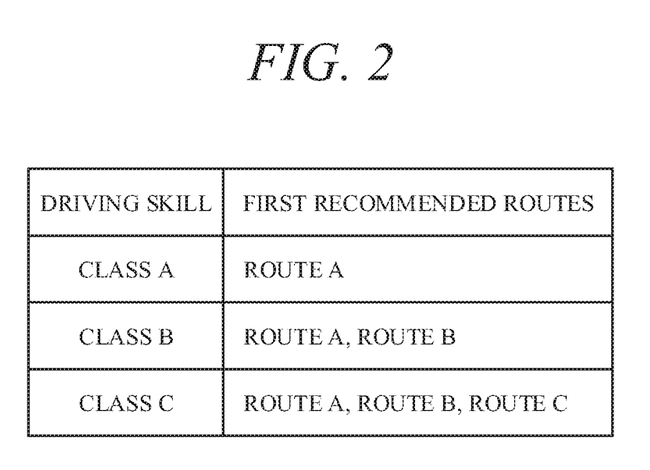
FIG. 2 is a diagram showing a relationship between driver driving skill and target routes used in processing of a first route generating unit of FIG. 1B.

The route generating unit 13 includes a first route generating unit 13A and a second route generating unit 13B. The first route generating unit 13A generates one or more target routes matched to driver driving skill detected by the skill detecting unit 11 (first recommended route(s)). More specifically, the first route generating unit 13A reads target route information including multiple target routes from current position to destination calculated by the route calculating unit 46 and based on the target route information generates first recommended routes matched to driver skill. FIG. 2 is a diagram showing an example of relationship between driver skill and first recommended routes. Routes A to C in the drawing are different routes from current position to destination.

Routes A to C are respectively target routes for a beginner driver, a mid-level driver and an expert driver, which the route calculating unit 46 calculated with consideration to, inter alia, road width, traffic volume, number of right-left turns, speed limit, and traffic accident history. For example, Route A is a route satisfying conditions such as wide roads, low traffic volume, few right-left turns, and infrequent need to change lanes, and as such is a route suitable for a beginner driver. In contrast, Route C is a route unsuitable for a beginner driver because of narrow roads, high traffic volume, many right-left turns, frequent need to change lanes, and so on.

As seen in FIG. 2, from among the multiple target routes calculated by the route calculating unit 46, the first route generating unit 13A generates Route A as a target route when driver driving skill is Class A, generates Routes A and B as target routes when driver driving skill is Class B, and generates Routes A to C as target routes when driver driving skill is Class C. In other words, the first route generating unit 13A generates one or more first recommended routes suitable for the driver taking driver driving skill into consideration.

When the feeling estimating unit 12 determines that the driver is displeased, the second route generating unit 13B generates from among the multiple target routes calculated by the route calculating unit 46 target routes different from the first recommended routes (second recommended routes). Namely, it generates target routes with consideration not only to driver driving skill detected by the skill detecting unit 11 but also to passenger feelings estimated by the feeling estimating unit 12. Alternatively, the route calculating unit 46 can recalculate target routes, and the route generating unit 13 can generate the second recommended routes after reading the recalculated target route data. The second recommended routes are less recommendable than the first.

Figure 3:
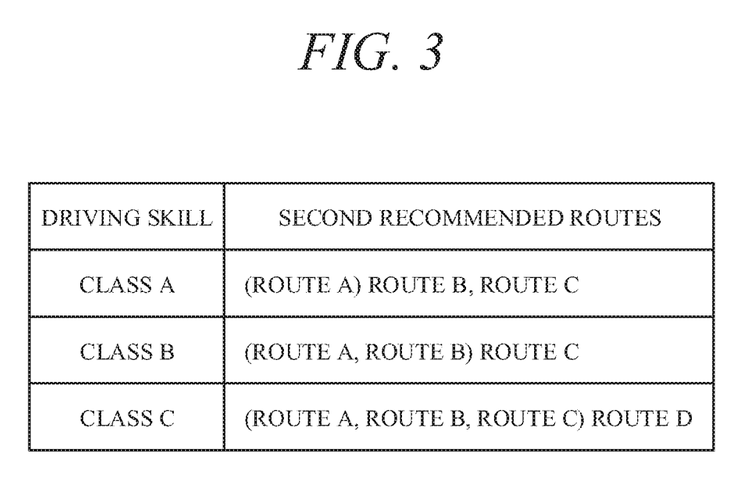
FIG. 3 is a diagram showing a relationship between driver driving skill and target routes used in processing of a second route generating unit of FIG. 1B.

FIG. 3 is a diagram showing an example of relationship between driver driving ability and second recommended routes. First recommended routes are shown in parentheses in the drawing. As seen in FIG. 3, the second route generating unit 13B generates Routes B and C as target routes when driver driving skill is Class A, generates Route C as a target route when driver driving skill is Class B, and generates Route D as a target route when driver driving skill is Class C. (Route D is a new route for an expert driver.)

The route presentation unit 14 presents target routes generated by the route generating unit 13 (first and second recommended routes) to the driver. For example, the route presentation unit 14 outputs control signals to the display 43 to display the target routes thereon. In this case, the first recommended routes are displayed on the display 43 first, and the second recommended routes are displayed on the display 43 later when the passenger feelings are unpleasant. Alternately, voice signals can be output to the speaker 44 to present the target routes vocally from the speaker 44.

When the route presentation unit 14 presents only a single route and the driver accepts the route by operation of the input unit 45 or voice input to the microphone 22, that route is decided as the final target route. When the route presentation unit 14 presents multiple routes, the final target route is decided by the driver's operating the input unit 45 or speaking into the microphone 22 to select one among them. The route guiding unit 47 thereafter performs vehicle route guidance while displaying the final target route on the display 43.

The vehicle can drive in a manual driving mode in which the actuators 50 are driven in response to driver operation of operating members (accelerator pedal, brake pedal, steering wheel, and so on), but is not limited to this mode and can also drive in an automatic driving mode in which at least some of the actuators 50 (e.g., the steering actuator) are automatically operated. Driving mode is switched by operating a mode change switch (not shown), for example. In manual driving mode-selected condition, the driving controller 15 enables manual vehicle driving by outputting control signals to the actuators 50 based on signals from the vehicle state detectors 33 (accelerator pedal sensor, brake pedal sensor, and so on). In automatic driving-selected condition, the driving controller 15 enables automatic vehicle driving by outputting control signals to the actuators 50 based on signals from the obstacle detector 31 and camera 32 so that the vehicle drives along a driving route (target route) determined in advance.

The driving controller 15 has a drive assisting unit 15A that assists the driver perform driving operations. When a second recommended route is decided as the final target route, the drive assisting unit 15A intervenes in driver driving operations by outputting control signals to the actuators 50 in accordance with detection signals from the sensor group 30. Namely, the drive assisting unit 15A performs case-specific drive assist actions respectively in a case where Route B or C is decided as the final target route for a driver of Class A driving skill, in a case where Route C is decided as the final target route for a driver of Class B driving skill, and in a case where Route D is decided as the final target route for a driver of Class C driving skill.

More specifically, the drive assisting unit 15A monitors vehicle state, vehicle surrounding conditions and the like based on signals from the sensor group 30 and outputs control signals to the actuators 50 so as to adjust operation amount, speed and the like of operating members based on the monitoring results. On the other hand, the ECU 10 disables the functions of the drive assisting unit 15A when a first recommended route is decided as the final target route.

The drive assisting unit 15A increases degree of driving operation intervention (assistance) in proportion as degree of divergence between a first recommended route and a second recommended route is larger. For example, when Route C is selected for a driver of Class A driving skill, degree of intervention is increased relative to that when Route B is selected. The greater is degree of intervention, the higher is level of intervention in the driver's driving operations (the greater is amount of driving operation correction) and the closer vehicle driving mode comes to automatic driving mode. In other words, the value of control signals output to the actuators 50 approaches the value of control signals output to the actuators 50 when in automatic driving mode.

Rather than providing the navigation unit 40 with the route calculating unit 46 for calculating target routes as described in the foregoing, route calculation capability can be instead incorporated in the ECU 10. For example, the route generating unit 13 can calculate target routes and generate the first and second recommended routes based thereon. Not only the route calculating unit 46 but also the route guiding unit 47 can be provided in the ECU 10. Conversely, at least some constituents of the ECU 10 (e.g., the route generating unit 13 and/or route presentation unit 14) can be provided in the navigation unit 40. In addition, if a client-server architecture is utilized, and depending on the client-server format, some functions, e.g., route calculation function, can be used for calculation on the server side. In such case, the drive assist apparatus 100 is additionally provided with a wireless unit (not shown) enabling wireless communication through a mobile telephone network or a mobile wireless terminal such as a smartphone, and functions of the route generating unit 13, route calculating unit 46 and so on are established on the server side. Although on the one hand implementation of such a client-server architecture requires a number of additional constituents, like a wireless unit, on the other hand it allows data required when deciding the Routes A to C (e.g., traffic volume, traffic accident history and so on) to be kept on the server side where the data is constantly maintained as the most recent under centralized management. Moreover, the fact that data from numerous drive assist apparatuses 100 are consolidated in the server leads to another advantage of it becoming possible to apply disciplines like machine learning to continually evolve the logic used for route creation.

Figure 4:
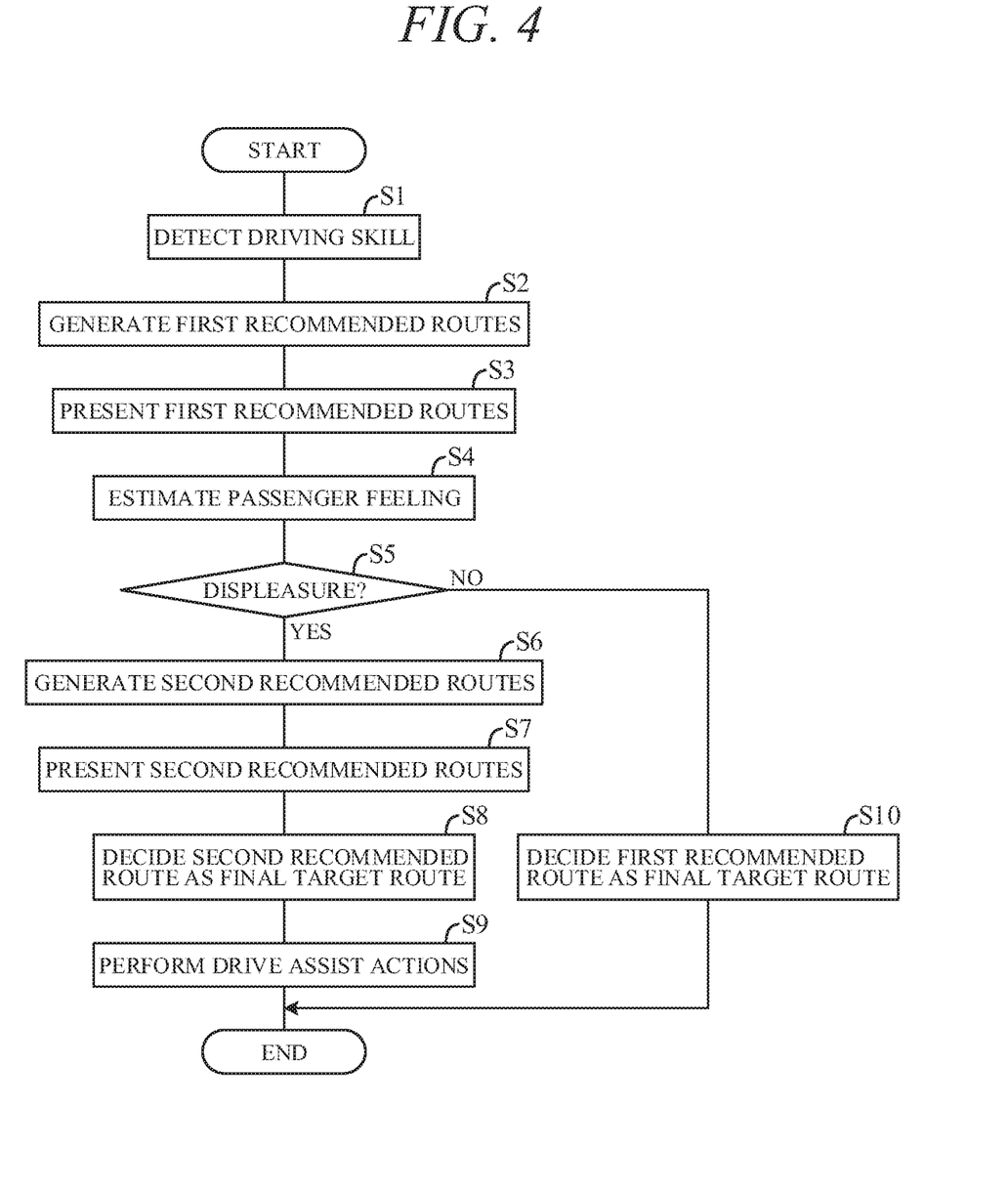
FIG. 4 is a flowchart showing an example of processing performed by the ECU of FIG. 1A.

FIG. 4 is a flowchart showing an example of processing performed by the ECU 10 in accordance with a program loaded in memory in advance. The processing of this flowchart is commenced, for example, when with manual driving mode selected a destination is set via the navigation unit 40.

First, in S1 (S: processing Step), the skill detecting unit 11 detects driver driving skill based on driver data stored in memory in advance. Next, in S2, the first route generating unit 13A generates one or more first recommended routes (FIG. 2) matched to the driving skill detected in S1. Then, in S3, the route presentation unit 14 presents a first recommended route or routes to the driver by displaying the single or multiple first recommended routes generated in S2 on the display 43.

Following this, in S4, the feeling estimating unit 12 estimates passenger emotion (feelings) of the driver based on information acquired by the biometric information acquiring unit 20. Thereafter, in S5, the feeling estimating unit 12 determines whether passenger feelings estimated in S4 are feelings of displeasure. When displeasure is estimated, the driver is presumed to be dissatisfied with the presented route(s). In this case, the result in S5 is YES and the program goes to S6, in which the second route generating unit 13B generates one or more new routes, i.e., second recommended routes (FIG. 3), matched to driving skill detected in S1. Next, in S7, the route presentation unit 14 presents second recommended route or routes to the driver by displaying the second recommended route(s) generated in S6 on the display 43.

Next, in S8, a second recommended route is decided as the final target route. In this case, when a single second recommended route is displayed and the driver accepts the second recommended route, the displayed second recommended route is decided as the final target route. When multiple second recommended routes are displayed and the driver selects one of them, the selected second recommended route is decided as the final target route. Next, the drive assisting unit 15A performs drive assist actions in proportion to divergence between a first recommended route and the target route (second recommended route). Namely, it performs drive assist actions so as to increase degree of intervention in proportion as degree of divergence is larger.

On the other hand, when it is determined in S5 that estimated passenger feelings are not feelings of displeasure, the program goes to S10. In this case, the driver is presumed to be satisfied with the first recommended route(s) displayed in S3. Therefore, when a single first recommended route is displayed in S3, that route is decided as the final target route in S10, and when multiple first recommended routes are displayed, a route selected by the driver is decided as the final target route in S10. In this case, drive assist actions are not performed.

There now follows a detailed explanation of the operations of the drive assist apparatus according to the present embodiment. When the vehicle destination is set in the navigation unit 40 and multiple target routes to the destination are calculated, the first route generating unit 13A uses these target routes to generate one or more first recommended routes matched to driver skill and displays the first recommended route(s) on the display 43 (S1 to S3). The feeling estimating unit 12 determines from driver feelings at this time whether the driver is satisfied with the displayed first route(s), and when the driver is determined to be satisfied, one of the first recommended routes is decided as the final target route (S4→S5→S10). The navigation unit 40 (route guiding unit 47) thereafter performs route guidance in accordance with the final target route.

On the other hand, when the driver is determined to be dissatisfied (displeased) with the displayed first recommended route(s), the second route generating unit 13B generates one or more second recommended routes matched to driver driving skill and displays the second recommended route(s) on the display 43 (S4 to S7). In this situation, when the driver selects one of the second recommended routes, the selected second recommended route is decided as the final target route (S8). Since this scheme increases the number of target routes the driver can choose from, it helps to enhance driver satisfaction. Once a second recommended route is decided as the final target route, drive assist actions are performed (S9). Suitable drive assistance matched to driver skill can therefore be performed.

The present embodiment can achieve advantages and effects such as the following:

(1) The drive assist apparatus 100 includes: the skill detecting unit 11 for detecting driver driving skill; the biometric information acquiring unit 20 for acquiring driver biometric information; the feeling estimating unit 12 for estimating driver emotion (feelings) based on biometric information acquired by the biometric information acquiring unit 20; the route generating unit 13 for generating target routes based on driver driving skill detected by skill detecting unit 11 and driver feelings estimated by the feeling estimating unit 12; and the route presentation unit 14 for presenting to the driver target routes generated by the route generating unit 13 (FIGS. 1A and 1B). Owing to the generation of target routes with consideration not only to driver driving skill but also to driver feelings in this manner, adoption of a final target route that displeases the driver is avoided and driver satisfaction with target route presentation is enhanced.

(2) The route generating unit 13 generates one or more first recommended routes matched to driving skill detected by the skill detecting unit 11, and thereafter generates one or more second recommended routes based on driver feelings estimated by the feeling estimating unit 12 following presentation of the first recommended route(s) by the route presentation unit 14 (S2 and S6). As a result, the less recommendable second recommended route(s) taking driver feelings into consideration are presented after the first recommended route(s) matched to driver driving skill are presented. Target routes can therefore be presented in a manner suitable for the driver because presentation of the first recommended route(s) matched to driver driving skill is given precedence over presentation of the second recommended route(s).

(3) The drive assist apparatus 100 further includes the drive assisting unit 15A for assisting driver driving operations in accordance with driver driving skill detected by the skill detecting unit 11 (FIG. 1B). Therefore, once a target route is decided with consideration to driver feelings, i.e., once a route not well matched to the driver's driving skill (a second recommended route) is decided as the final target route, unskillful driving operations can be compensated to achieve favorable vehicle driving.

(4) The drive assisting unit 15A is enabled when the vehicle is driving in accordance with a second route and is disabled when the vehicle is driving in accordance with a first route (S5 and S9). Since the drive assisting unit 15A is therefore prevented from intervening in driving operations more than necessary, a favorable driving feel can be realized.

(5) When driver driving skill detected by the skill detecting unit 11 is equal to or greater than a predetermined value, i.e., when it is Class B or Class C skill, the route generating unit 13 generates multiple first recommended routes selectable by the driver (FIG. 2). Since the driver can therefore select a desired route as the final target route, a high level of driver satisfaction is ensured.

(6) The drive assist apparatus 100 further includes the route guiding unit 47 for providing vehicle route guidance from current position to destination in accordance with a target route (final target route) presented by the route presentation unit 14 (FIG. 1A). The driver can therefore be offered a helpful service using a target route determined with consideration to driver driving skill and driver feelings.

(7) The drive assist method according to the present embodiment includes detecting driver driving skill (S1), acquiring driver biometric information and estimating driver emotion (feelings) based on the acquired biometric information (S4), generating target routes based on acquired driver driving skill and estimated driver feelings (S6), and presenting generated target routes to the driver (S7). As a result, driver satisfaction with target route presentation can be enhanced.

Figure 5:
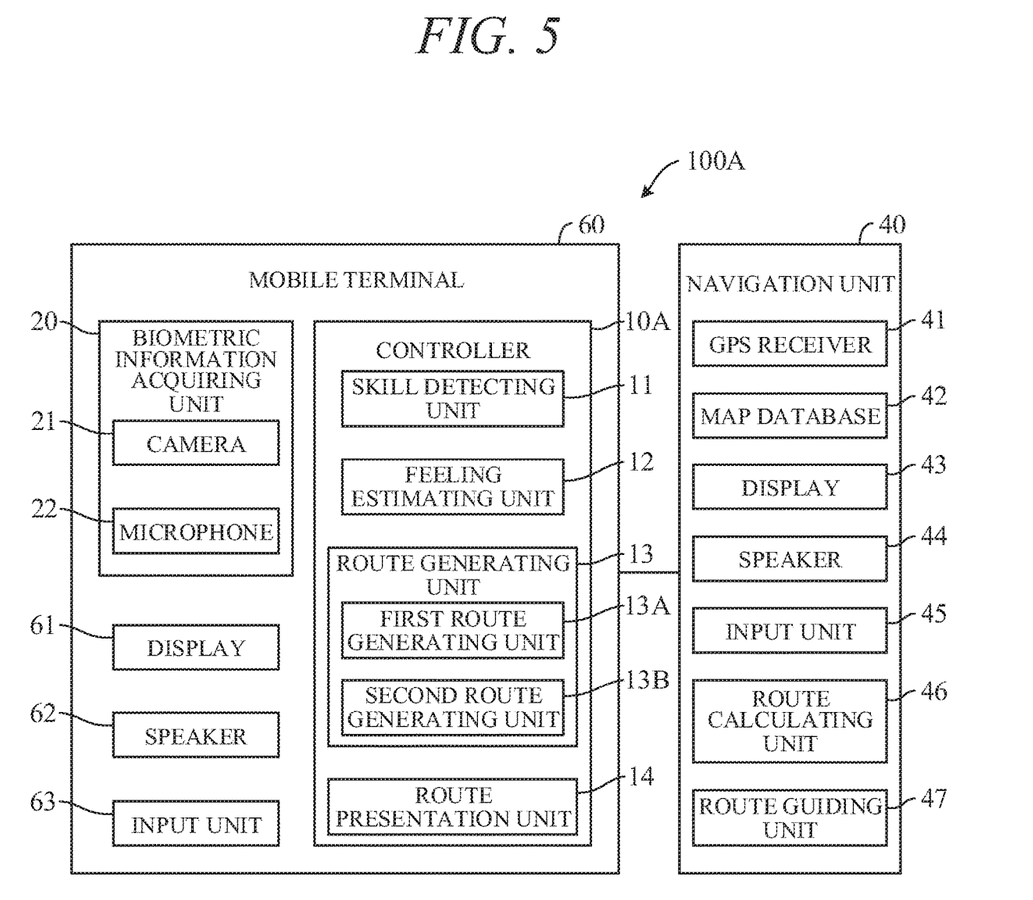
FIG. 5 is a diagram showing a modification example of FIGS. 1A and 1B.

Although in the aforesaid embodiment the drive assist apparatus 100 is configured using the ECU 10 installed in the vehicle, the drive assist apparatus can instead be configured using a smartphone or other mobile terminal carried by the driver. FIG. 5 is a diagram showing an example of such a drive assist apparatus. In a drive assist apparatus 100A of FIG. 5, portions the same as those of FIGS. 1A and 1B are assigned like symbols. As shown in FIG. 5, a mobile terminal 60 comprises the camera 21 and the microphone 22, which together constitute the biometric information acquiring unit 20. The mobile terminal 60 has a controller 10A, and the controller 10A has functional constituents in common with the ECU 10 of FIG. 1B, namely, the skill detecting unit 11, feeling estimating unit 12, route generating unit 13, and route presentation unit 14. In addition, the mobile terminal 60 has a display 61, a speaker 62 and an input unit 63.

The mobile terminal 60 is configured to be communicable with the navigation unit 40. Owing to this arrangement, similarly to what was explained earlier, target routes can be presented that give consideration to driver driving skill and driver feelings. Although illustration of a driving controller is omitted in FIG. 5, the driving controller 15 can be provided in the controller 10A in the same way as in the ECU 10 of FIGS. 1A and 1B, and by communication with the vehicle control ECU, for example, the actuators 50 can be controlled by commands from the mobile terminal 60 based on signals from the sensor group 30.

The route calculating unit 46 and route guiding unit 47 of the navigation unit 40 can also be provided in the controller 10A of the mobile terminal 60. Information regarding target routes can be presented through the display 61 and the speaker 62 of the mobile terminal 60 instead of through the display 43 and the speaker 44 of the navigation unit 40. Input of various commands through the input unit 63 of the mobile terminal 60 instead of through the input unit 45 of the navigation unit 40 can be enabled. The mobile terminal 60 can be equipped with a GPS receiver. The mobile terminal 60 can also acquire map data by communicating with equipment outside the vehicle. A drive assist apparatus can therefore be constituted solely by the mobile terminal without using the navigation unit 40.

In the aforesaid embodiment, the skill detecting unit 11 is adapted to detect driver driving skill based on driver data stored in memory beforehand, but various other methods of detecting driver driving skill are also available. For example, driving skill can be determined by prior driving and driver driving skill be detected based on the results. It is also possible for driver data to be transmitted to the skill detecting unit 11 of the ECU 10 at vehicle starting (turn-on of ignition switch) by pairing with a wireless terminal carried by the driver, such as a smartphone or any of various wearable terminals or the like. Although this complicates hardware and software configuration, it is advantageous in terms of vehicle security because no driver data needs to be recorded on the vehicle side. Moreover, since driving assistance can be provided even to drivers who drive a number of different vehicles, the invention can be applied to rental cars and car sharing services, for example. Thus, the skill detecting unit is not limited to the aforesaid configuration.

In the aforesaid embodiment, passenger (driver) biometric information is acquired by the biometric information acquiring unit 20 including the camera 21 and microphone 22, but the biometric information acquiring unit is not limited to this configuration. For example, an arrangement can be adopted in which passenger biometric information, including pulse, blood pressure, body temperature, blood oxygen concentration and the like, is acquired using a wearable terminal borne by the passenger. Also possible is to acquire passenger body temperature (e.g., face temperature) as biometric information using thermography.

Although the feeling estimating unit 12 estimates passenger emotions (feelings) by matching with Plutchik's wheel of emotions in the aforesaid embodiment, the feeling estimating unit is not limited to the aforesaid configuration and passenger feelings can instead be estimated by matching with other categorized emotion patterns.

In the aforesaid embodiment, the route generating unit 13 generates one or more first recommended routes matched to driver driving skill detected by the skill detecting unit 11 and thereafter generates one or more second recommended routes based on driver feelings estimated by the feeling estimating unit 12 following presentation of the first recommended route(s), but the route generating unit can be of any configuration insofar as it generates target routes with consideration to driver driving skill and driver feelings.

In the aforesaid embodiment, the route presentation unit 14 presents target routes to the driver through the display 43 or the speaker 44, but as it suffices for target routes to be output in a mode the driver can recognize, the route presentation unit is not limited to the aforesaid configuration and can be adapted to output target routes to means other than the display or speaker.

In the aforesaid embodiment, a target route from current location to destination is explained as an example of a drive plan. In other words, the route generating unit 13 and the route presentation unit 14 are used as examples of a plan generating unit and a plan presentation unit, respectively, but the present invention can also be similarly applied to other drive plans. Therefore, the configuration of the plan generating unit that generates drive plans based on driver driving skill and driver feelings, and the configuration of the plan presentation unit that presents generated drive plans to the driver are not limited to those described in the foregoing.

In the aforesaid embodiment, degree of driving operation assistance is made greater when a second recommended route is decided as the final target route than when a first recommended route is decided as the final target route by disabling driving operation assistance function in response to commands from the drive assisting unit 15A when a first recommended route is decided as the final target route. However, the drive assisting unit is not limited to this configuration and, for example, driving operation assistance function can be enabled even when a first recommended route is decided as the final target route.

In the aforesaid embodiment, when the feeling estimating unit 12 determines that the driver is displeased, the second route generating unit 13B generates from among multiple target routes calculated by the route calculating unit 46 one or more target route(s) (second recommended route(s)) different from the first recommended route(s). However, second recommended routes can also be generated at times other than when the driver is determined to be displeased. For example, second recommended routes can be generated when the driver is highly pleased. This is because in a case such as when the driver is excited about an event at the destination, the driver's concentration on driving is sometimes low, so that it is advisable to treat highly pleasurable feelings similarly to feelings of displeasure.

The above embodiment can be combined as desired with one or more of the above modifications. The modifications can also be combined with one another.

According to the present invention, since drive plans are generated and presented in accordance with the driver driving skill and the driver feelings, the driver satisfaction with presentation of the drive plans can be fully enhanced.

Above, while the present invention has been described with reference to the preferred embodiments thereof, it will be understood, by those skilled in the art, that various changes and modifications may be made thereto without departing from the scope of the appended claims.

What is claimed is:

1. A drive assist apparatus, comprising:
a biometric information acquiring unit configured to acquire biometric information of a driver of a vehicle; and
a CPU and a memory coupled to the CPU, wherein the CPU and the memory are configured to perform:
detecting a driving skill of the driver;
estimating a feeling of the driver based on the biometric information acquired by the biometric information acquiring unit;
generating a first drive plan based on the driving skill detected;
presenting the first drive plan generated to the driver; and
generating a second drive plan based on the feeling of the driver estimated after the first drive plan is presented.

2. The drive assist apparatus according to claim 1, wherein
the first drive plan is a target route from a current location to a destination, wherein the CPU and the memory are further configured to perform:
performing a route guiding of the vehicle in accordance with the target route presented.

3. The drive assist apparatus according to claim 1, wherein the CPU and the memory are further configured to perform:
assisting a driving operation of the driver in accordance with the driving skill detected.

4. The drive assist apparatus according to claim 3, wherein the CPU and the memory are further configured to perform:
the assisting comprising increasing a degree of assistance of the driving operation when the vehicle is driving in accordance with the second drive plan, than when the vehicle is driving in accordance with the first drive plan.

5. A drive assist apparatus, comprising:
a biometric information acquiring unit configured to acquire biometric information of a driver of a vehicle; and
a CPU and a memory coupled to the CPU, wherein the CPU and the memory are configured to perform:
detecting a driving skill of the driver;
estimating a feeling of the driver based on the biometric information acquired by the biometric information acquiring unit;
generating a drive plan based on the driving skill detected and the feeling estimated; and
presenting the drive plan generated to the driver, wherein
the generating comprising generating multiple plans selectable by the driver when the driving skill detected is equal to or greater than a predetermined value.

6. The drive assist apparatus according to claim 5, wherein
the drive plan is a target route from a current location to a destination, wherein the CPU and the memory are further configured to perform:
performing a route guiding of the vehicle in accordance with the target route presented.

7. A drive assist method, comprising:
detecting a driving skill of a driver of a vehicle;
acquiring a biometric information of the driver;
estimating a feeling of the driver based on the biometric information acquired;
generating a first drive plan based on the driving skill detected;
presenting the first drive plan generated to the driver; and
generating a second drive plan based on the feeling of the driver estimated after the first drive plan is presented.

8. The drive assist method according to claim 7, further comprising:

assisting a driving operation of the driver in accordance with the driving skill detected.

9. The drive assist method according to claim 8, further comprising:
the assisting comprising increasing a degree of assistance of the driving operation when the vehicle is driving in accordance with the second drive plan, than when the vehicle is driving in accordance with the first drive plan.

10. The drive assist method according to claim 7, wherein the first drive plan is a target route from a current location to a destination, wherein the method further comprises:
performing a route guiding of the vehicle in accordance with the target route presented.

11. A drive assist method, comprising:
detecting a driving skill of a driver of a vehicle;
acquiring a biometric information of the driver;
estimating a feeling of the driver based on the biometric information acquired;
generating a drive plan based on the driving skill detected and the feeling estimated; and
presenting the drive plan generated to the driver, wherein the generating comprising generating multiple plans selectable by the driver when the driving skill detected is equal to or greater than a predetermined value.

12. The drive assist method according to claim 11, wherein
the drive plan is a target route from a current location to a destination, wherein the method further comprises:
performing a route guiding of the vehicle in accordance with the target route presented.

\* \* \* \* \*